United States Patent
Wöhler et al.

(10) Patent No.: US 7,729,511 B2
(45) Date of Patent: Jun. 1, 2010

(54) METHOD AND DEVICE FOR SAFEGUARDING A HAZARDOUS AREA

(75) Inventors: Christian Wöhler, Heroldstatt (DE); Werner Progscha, Herrenberg (DE); Lars Krüger, Ulm (DE); Dietmar Döttling, Leinfelden-Echterdingen (DE); Martin Wendler, Stuttgart (DE)

(73) Assignees: Pilz GmbH & Co. KG, Ostfildern (DE); Daimler AG, Stuttgart (DE)

( * ) Notice: Subject to any disclaimer, the term of this patent is extended or adjusted under 35 U.S.C. 154(b) by 1208 days.

(21) Appl. No.: 11/088,041

(22) Filed: Mar. 23, 2005

(65) Prior Publication Data

US 2005/0207618 A1 Sep. 22, 2005

Related U.S. Application Data

(63) Continuation of application No. PCT/EP03/10279, filed on Sep. 16, 2003.

(30) Foreign Application Priority Data

Sep. 24, 2002 (DE) ................................ 102 45 720
Apr. 1, 2003 (DE) ................................ 103 15 216

(51) Int. Cl.
*G06K 9/00* (2006.01)
(52) U.S. Cl. .................... 382/103; 348/155; 340/508
(58) Field of Classification Search ................. 382/103; 348/155, 508
See application file for complete search history.

(56) References Cited

U.S. PATENT DOCUMENTS

| | | | | |
|---|---|---|---|---|
| 4,991,007 A | * | 2/1991 | Corley | 348/188 |
| 5,878,151 A | * | 3/1999 | Tang et al. | 382/103 |
| 5,912,980 A | * | 6/1999 | Hunke | 382/103 |
| 5,982,452 A | * | 11/1999 | Gregson et al. | 348/584 |
| 5,982,951 A | * | 11/1999 | Katayama et al. | 382/284 |
| 6,035,067 A | * | 3/2000 | Ponticos | 382/226 |
| 6,064,429 A | * | 5/2000 | Belk et al. | 348/128 |
| 6,088,468 A | * | 7/2000 | Ito et al. | 382/103 |

(Continued)

FOREIGN PATENT DOCUMENTS

DE    196 06 819 A1    8/1997

(Continued)

OTHER PUBLICATIONS

Martin Rechsteiner, Real Time Inverse Stereo System for Surveillance of Dynamic Safety Envelopes, 1997, pp. 18-39.

(Continued)

*Primary Examiner*—Daniel G Mariam
*Assistant Examiner*—Aklilu k Woldemariam
(74) *Attorney, Agent, or Firm*—Harness, Dickey & Pierce, P.L.C.

(57) ABSTRACT

In order to safeguard a hazardous area, in particular the hazardous area of an automatically operating machine, images of the hazardous area are recorded with at least a first and a second image recording unit that are arranged offset from one another. The images of the scene are subjected to three-dimensional scene analyses using different three-dimensional scene analysis methods, and the hazardous area is safeguarded when at least one of the scene analysis methods detects a foreign object.

14 Claims, 5 Drawing Sheets

U.S. PATENT DOCUMENTS

| | | | | |
|---|---|---|---|---|
| 6,097,429 | A | * | 8/2000 | Seeley et al. ............... 348/154 |
| 6,173,087 | B1 | * | 1/2001 | Kumar et al. ............... 382/284 |
| 6,654,481 | B2 | * | 11/2003 | Amemiya et al. ........... 382/103 |
| 6,711,279 | B1 | * | 3/2004 | Hamza et al. ............... 382/103 |
| 7,015,954 | B1 | * | 3/2006 | Foote et al. ............... 348/218.1 |
| 7,065,241 | B2 | * | 6/2006 | Lehner et al. ............... 382/152 |
| 7,200,246 | B2 | * | 4/2007 | Cofer et al. ................. 382/103 |
| 7,277,118 | B2 | * | 10/2007 | Foote ........................... 348/36 |
| 7,508,956 | B2 | * | 3/2009 | Scheppmann ............... 382/103 |
| 2001/0041077 | A1 | * | 11/2001 | Lehner et al. ............... 396/661 |
| 2002/0122113 | A1 | * | 9/2002 | Foote ........................... 348/48 |
| 2003/0030723 | A1 | * | 2/2003 | Dottling et al. ............... 348/82 |

FOREIGN PATENT DOCUMENTS

| | | |
|---|---|---|
| DE | 197 09 799 A1 | 9/1998 |
| DE | 198 09 210 A1 | 9/1999 |
| DE | 199 38 639 A1 | 2/2001 |
| DE | 100 33 608 A1 | 2/2002 |
| DE | 100 49 366 A1 | 4/2002 |
| DE | 101 38 960 A1 | 2/2003 |
| EP | 1 061 487 A1 | 12/2000 |
| JP | 06-281456 | 10/1994 |
| JP | 07-245757 | 9/1995 |
| JP | 2000-331252 | 11/2000 |
| WO | WO 02/069292 A1 | 9/2002 |
| WO | WO 02/073086 A1 | 9/2002 |
| WO | WO 2004/055732 | 7/2004 |

OTHER PUBLICATIONS

A. Suppes et al.; Robust Obstacle Detection from Stereoscopic Image Sequences Using Kalman Filtering; 2001; 7 pages.

BIA-Report; Jun. 1997; 3 pages.

D. Gavrila; A multi-sensor approach for the protection of vulnerable traffic participants—the Protector project; May 2001; 5 pages.

Dr. Sergio Montenegro; Book excerpt; 1999; 4 pages.

E.R. Davies; Book excerpt from Academic Press Limited; 1990; 4 pages.

European Standard EN 292-2; Jun. 1995; 6 pages.

European Standard EN 954-1; Mar. 1997; 5 pages.

U. Franke et al.; Fast Stereo based Object Detection for Stop&Go Traffic; Sep. 1995; 7 pages.

U. Franke et al.; Real-time Stereo Vision for Urban Traffic Scene Understanding; Oct. 2000; pp. 273-278.

* cited by examiner

METHOD AND DEVICE FOR SAFEGUARDING A HAZARDOUS AREA

CROSSREFERENCES TO RELATED APPLICATIONS

This application is a continuation application to international patent application PCT/EP2003/010279 filed on Sep. 16, 2003 designating the U.S., which international patent application was published in German language and which claims priority from German patent applications DE 102 45 720.4 filed on Sep. 24, 2002 and DE 103 15 216.4 filed on Apr. 1, 2003.

BACKGROUND OF THE INVENTION

The present invention relates to a method and a device for safeguarding a hazardous area, in particular the hazardous area of an automatically operating machine. In more detail, the invention relates to such a method and such a device using at least a first and a second image recording unit for recording at least two images of the hazardous area.

Hazardous areas, in particular hazardous areas of machines and industrial plants, are usually safeguarded so far by using light barriers, light curtains or laser scanners, often in combination with additional mechanical barriers. However, such protective measures require complicated installation and adjustment. In addition, these protective measures are not very flexible when it is desired to adapt the safeguarding of the hazardous area to different operational situations.

In order to overcome these disadvantages, attempts have been made for some time to safeguard a hazardous area by means of an image recording unit, typically a digital camera, and by means of intelligent image evaluation methods. Reference is made in this regard to DE 199 38 639 A1, by way of example. This reference discloses a device for safeguarding a hazardous area wherein a virtual barrier is generated in front of the hazardous area by means of the image recording unit and by means of an artificial, "cooperative" target. Breaking through the barrier can be detected with the image recording unit in the same way as in the case of a light barrier. If appropriate, the machine from which the hazard originates is switched off thereupon or put into a non-hazardous state in some other way.

Although this known device is already substantially easier to install and exhibits a higher level of flexibility than conventional light barriers etc., it is still a disadvantage that installation measures are required with the "cooperative target" in the area of the machine to be safe guarded.

A device having two image recording units arranged at a spacing from one another is disclosed by DE 197 09 799 A1. The images, which are supplied to an evaluation unit from the two image recording units, are subjected to a stereo image analysis in order to obtain a three-dimensional image of the hazardous area. The three-dimensional image is subsequently compared with a three-dimensional reference model in order to detect foreign objects, i.e. objects located inadmissibly in the hazardous area. However, it has emerged from practical experiments with a comparable arrangement that the reliability of detection with which the foreign objects can be detected in the hazardous area is inadequate. This applies at least to the extent that such a device is to be used for protecting persons from automatically operating machines. Extremely short reaction times (in the range of 30 ms) and a virtually one hundred percent reliability of detection are required for such an application.

A similar device and a corresponding method are also disclosed by EP 1 061 487 A1, and what has been said above with regard to the disadvantages also applies here.

DE 198 09 210 A1 discloses a device and a method for monitoring what is called a scene. The scene is recorded with a single image recording unit and compared with a reference image. Individual points inside the scene are specifically illuminated by means of a light source in order to obtain a marking or individualization when recording the image. However, this method has the disadvantage that the illumination of the scene, thus of the hazardous area in the specific case of application, causes susceptibility to faults owing to the incursion of scattered extraneous light. Faults owing to extraneous light can occur, in particular, in industrial production environments, for example with welding robots or with large brake presses.

SUMMARY OF THE INVENTION

Against this background, it is an object of the present invention to provide an improved method and a corresponding device which allow to safeguard a hazardous area without a large outlay on installation, but with adequate reliability.

According to one aspect of the invention, this object is achieved by a method of the type mentioned at the outset, wherein the scene analysis is carried out on the basis of the at least two images using at least two algorithmically different methods, and wherein the hazardous area is safeguarded when at least one of the analysis methods detects a foreign object.

According to another aspect, the object is achieved by a device of the type mentioned at the outset, wherein the evaluation unit is designed for carrying out the scene analysis using at least two algorithmically different methods.

It is preferably suggested to carry out a three-dimensional evaluation of the hazardous area on the basis of at least two images that are recorded with mutually offset image recording units. Appropriate scene analysis methods are known, for example, from a book entitled "Three-Dimensional Computer Vision: A Geometric Viewpoint" by Olivier Faugeras, MIT Press, Cambridge, or from an article entitled "Fast Stereo Based Object Detection for Stop & Go Traffic" by U. Franke/I. Kutzbach, INTELLIGENT VEHICLES SYMPOSIUM, pages 339-344, Tokyo 1996, both documents are incorporated herein by reference. An appropriate analysis method is also disclosed by international patent application WO2004055732, which is also incorporated herein by reference. On their own, those methods known to date do not provide the reliability of detection required to ensure that the hazardous area of an automatically operating machine is reliably safeguarded. However, it has now surprisingly emerged that the combination of different three-dimensional scene analysis methods that are executed in parallel with one another enables the reliability of detection required for this application to be achieved.

Objects in the recorded images are detected by means of separate scene analysis methods, and, preferably, their spatial position is determined. The spatial position of the objects is subsequently used to check whether the latter are located in the monitored hazardous area, and whether "foreign objects" are involved in this case. Additional external aids such as, for example, a cooperative target or a specific marking of individual points of the recorded hazardous area with light are not required. The inventive solution therefore renders possible a low outlay on installation. Moreover, a large degree of flexibility is rendered possible by the novel device and the corresponding method because of the numerous variants of modern evaluation systems.

The various scene analysis methods that are currently available each have individual strengths and weaknesses, in particular with regard to the reliability of detection and susceptibility to faults. The respective weaknesses can be compensated by combining different methods. The hazardous area is safeguarded as soon as even only one of the scene analysis methods detects a foreign object, the monitored machine thus being switched off or otherwise brought to a state of rest, for example. The high requirements that are placed on protective devices for machine safety can thus be met surprisingly easy.

Moreover, the novel device has the advantage that diversity is necessarily produced through the use of different methods for scene analysis. The intrinsic fail-safety of the overall device with reference to malfunctions and faults is thereby reduced. This is of great significance with regard to the preferred field of application, specifically safeguarding machines and installations.

Stereo image processing is understood here to mean the use of two cameras with approximately parallel optical axes and an approximately identical focal length. A disparity map (3-D cloud of points) is determined due to the fact that a pixel in the left-hand image is assigned to a pixel in the right-hand image, this being based in general on a small local environment of the respective pixel.

By contrast, a three-dimensional scene analysis is understood to be a method in which object parameters are adapted such that there is an optimization of the parameters by means of a target function that is established simultaneously by means of at least two images of the object, as it is disclosed, for instance, by Matusik et al., "Image-Based Visual Hulls", SIGGRAPH 2000 or by international patent application WO2004055732, both of which are also incorporated herein by reference. The reliability of detection is raised compared to conventional stereo image processing methods, since the recognition is performed here at a level of relatively high information content.

In a refinement of the invention, the first and the second images are subjected on the one hand to a correlation-based scene analysis and, on the other hand, to a contour-based scene analysis.

A correlation-based scene analysis in the meaning of the invention is known, for example, from the article by Franke/Kutzbach already mentioned above or from another article entitled "Real-Time Stereo Vision for Urban Traffic Scene Understanding" by U. Franke/A. Joos, IEEE INTELLIGENT VEHICLES SYMPOSIUM, 2000, which is also incorporated herein by reference.

A contour-based scene analysis is known, for example, from the publication of Matusik, already mentioned above, or from above mentioned international patent application. As has been shown in practical experiments, the combination of these methods for scene analysis delivers particularly good results with regard to the reliability of detection and, furthermore, also with regard to the intrinsic fail-safety of the overall device.

In a further refinement of the invention, at least one of the methods processes only such image regions that differ significantly from a reference image.

This measure has proved to be particularly advantageous for the preferred field of application of the invention, since it is possible thereby to raise the processing speed. Consequently, the reaction times of the device can be shortened, and this renders possible a high degree of flexibility in the fashioning of protective zones, on the one hand, and a better protection of operating personnel, on the other hand.

In a simple refinement of the method, only one image pair is generated and the two scene analysis methods are carried out on it. This refinement has the advantage that it can be realized simply in terms of hardware. Under unfavorable conditions, however, there can be the disadvantageous effect that a three-dimensional analysis is not possible for structures in the image that are oriented along the connecting line of the two image recording units.

In order also to be able to record such structures in three-dimensions, it is advantageous to record at least one further image of the scene with at least one further image recording unit. These further image recording units should not lie on the same line with the first two image recording units.

In order to keep the device simple in terms of hardware, it is advantageous when three recorded images of the scene are interpreted as two image pairs, the first and the second image pair having an image in common in each case. This procedure can also be extended correspondingly to the use of more than three images.

A particularly high degree of safety is achieved when a number of scene analysis methods are applied to each image pair.

In a particularly advantageous refinement, the inventive device has at least a third image recording unit for recording a third image of the hazardous area. The evaluation unit is set up in this case such that at least one of the two scene analysis methods is applied to the at least three images. The required computing power and computing time are lowered by means of selecting a single one of the two possible methods for scene analysis.

In a further refinement, a number of temporarily successive groups of at least two synchronously recorded images are evaluated in order to determine at least one movement parameter of a detected foreign object, such as, in particular, speed, direction of movement etc.

Due to this measure, it is possible to estimate more accurately the degree of hazard originating from the monitored machine or the like. An intelligent reaction to a detected foreign object is possible as a result thereof. For example, in the case of a foreign object that is moving only slowly inside the hazardous area, it is possible firstly to generate an advance warning, while the monitored machine is switched off directly in the case of a quickly moving foreign object.

In a further refinement, a future exposure time of the image recording units is set as a function of the current images.

The exposure time of the image recording units is matched adaptively to changing environmental conditions by this measure. The novel device can therefore react automatically to changing environmental conditions, for example day-light influences. On the one hand, the reliability of detection is raised thereby, and on the other hand undesired false alarms can be better avoided.

In a further refinement of the invention, at least two of the image recording units are arranged in a common equipment housing.

This refinement has the advantage that a large part of the required calibration work as well as the adjustment of the two image recording units relative to one another can be undertaken by the manufacturer at his works. The onsite outlay on installing the inventive device is thereby simplified still further. Moreover, the reliability of detection is raised even further for the entire device by a precise calibration under laboratory conditions.

It goes without saying that the aforementioned features and the features still to be explained below can be used not only in the combination respectively specified, but also in other combinations or on their own without departing from the scope of the present invention.

BRIEF DESCRIPTION OF THE FIGURES

Exemplary embodiments of the invention are illustrated in the drawing and explained in more detail in the following description. In the drawing.

DESCRIPTION OF PREFERRED EMBODIMENTS

Figure 1:
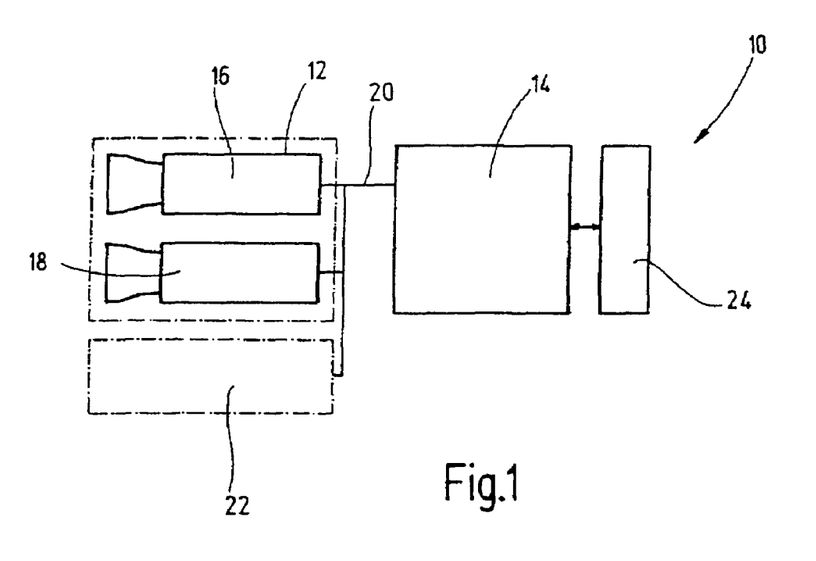
FIG. 1 shows a simplified block diagram of an inventive device.

An embodiment of the inventive device is denoted in its entirety in FIG. 1 by reference numeral 10. The device 10 includes a camera module 12 and an evaluation unit 14. Illustrated inside the camera module 12 are two image recording units 16, 18 (denoted as "camera 1" and "camera 2" in the following). The image recording units 16, 18 each can be complete, independently functional cameras. As an alternative, however, individual parts of the two cameras can also be used jointly such that there are essentially two separate image sensors then, and, if appropriate, associated optics in each case.

The image recording units 16, 18 are connected to an evaluation unit 14, spatially somewhat set apart, via a bus 20. As an alternative to this, it is also possible to integrate the two image recording units 16, 18 and the evaluation unit 14 in a common housing, or to use other kinds of an analog or digital interface. The presently illustrated arrangement with a spatially separate evaluation unit 14 has the advantages of a modular system, such as the lower weight of the individual components, separate possibility of replacement etc. Moreover, it is possible in this way for a further camera module 22, illustrated here only schematically, to be connected to the same evaluation unit 14 in a very simple fashion.

Reference numeral 24 denotes a switching device that contains relays or contactors, for example. The switching device can be used to switch off the drives of a monitored machine, installation or the like in a way known per se. The switching device 24 can also be implemented, for example, in the form of a failsafe PLC (programmable logic controller), i.e. what is called a safety controller. It is preferred in this case when the evaluation unit 14 is connected to the safety controller via a failsafe field bus equipment, such as the SafetyBus® from Pilz GmbH & Co., Germany (one of the present assignees). The safety controller is a PSS 3000 from Pilz GmbH & Co, for example.

The basic mode of operation of device 10 is described below together with a preferred exemplary embodiment by means of FIGS. 2 and 3. Identical reference numerals respectively denote identical elements in this case.

After the device 10 has been switched on, it firstly carries out a self-test in accordance with step 30 in order to check acceptable functioning. In the course of the self-test, the individual components of the evaluation unit 14 and of the image recording units 16, 18 are checked for acceptable functioning, inter alia. In accordance with step 32, the outputs of the switching device 24 are switched off, i.e. a monitored machine is reliably brought into a defined, safe state.

In accordance with step 34, which is optional, a light source is switched on as an additional illumination. This is done particularly whenever the existing ambient brightness is inadequate to carry out the subsequent image evaluation.

In accordance with steps 36, 38, the monitored hazardous area is recorded by the image recording units 16, 18. In other words, the image recording unit 16 supplies a first image of the hazardous area, and the image recording unit 18 supplies a second image thereof. In accordance with the exemplary embodiment illustrated here, this is performed in parallel, i.e. with image recording. units 16, 18 synchronized with one another.

What is called image preprocessing is subsequently performed in accordance with step 42. Depending on the application, methods known per se for conditioning the recorded images, for example an FPN (Fixed Pattern Noise) correction, are carried out here. Furthermore, the recorded first and second images are matched to one another with regard to background brightnesses etc.

In accordance with steps 44, 46, the image pair consisting of the first and the second image is subsequently evaluated by means of two different scene analysis methods, in order to detect foreign objects inside the hazardous area. In step 44, the first and second images of the hazardous area are subjected to a correlation-based image analysis. By contrast, a contour-based image analysis is performed in step 46.

In a particularly preferred exemplary embodiment, the contour-based image analysis includes a regional segmentation, i.e. a division of the first and second images into individual regions to be compared. It is then preferred to evaluate only regions that differ significantly from a reference image.

Alternatively, however, in other exemplary embodiments it is also possible to use an algorithm such as is described in above-mentioned EP 1 061 487 A1 or in above-mentioned Matusik et al., "Image-Based Visual Hulls", SIGGRAPH 2000, for example. For correlation-based image analysis, it is preferred to use an algorithm such as described in the articles by U. Franke cited above. Basically, however, other scene analysis methods might also come into consideration here.

In step 48, a decision is made on the basis of the results of the two scene analyses as to whether a violation of the protected space exists, i.e. whether an object has inadmissibly penetrated into the monitored hazardous area. If this not the case, the outputs of the switching device 24 are switched on in accordance with step 50, i.e. the monitored machine is taken into operation.

If a protective space violation by a foreign object has been detected, the method branches to step 32, whereupon the outputs of the switching device are switched off (or remain so if a foreign object was already detected in the previous method cycle). The monitored machine etc. is thereby kept in its safe rest position. It goes without saying that steps 34 to 50 are repeated recursively in order to ensure that the hazardous area is safeguarded continuously during operation of the device 10.

Figure 3:
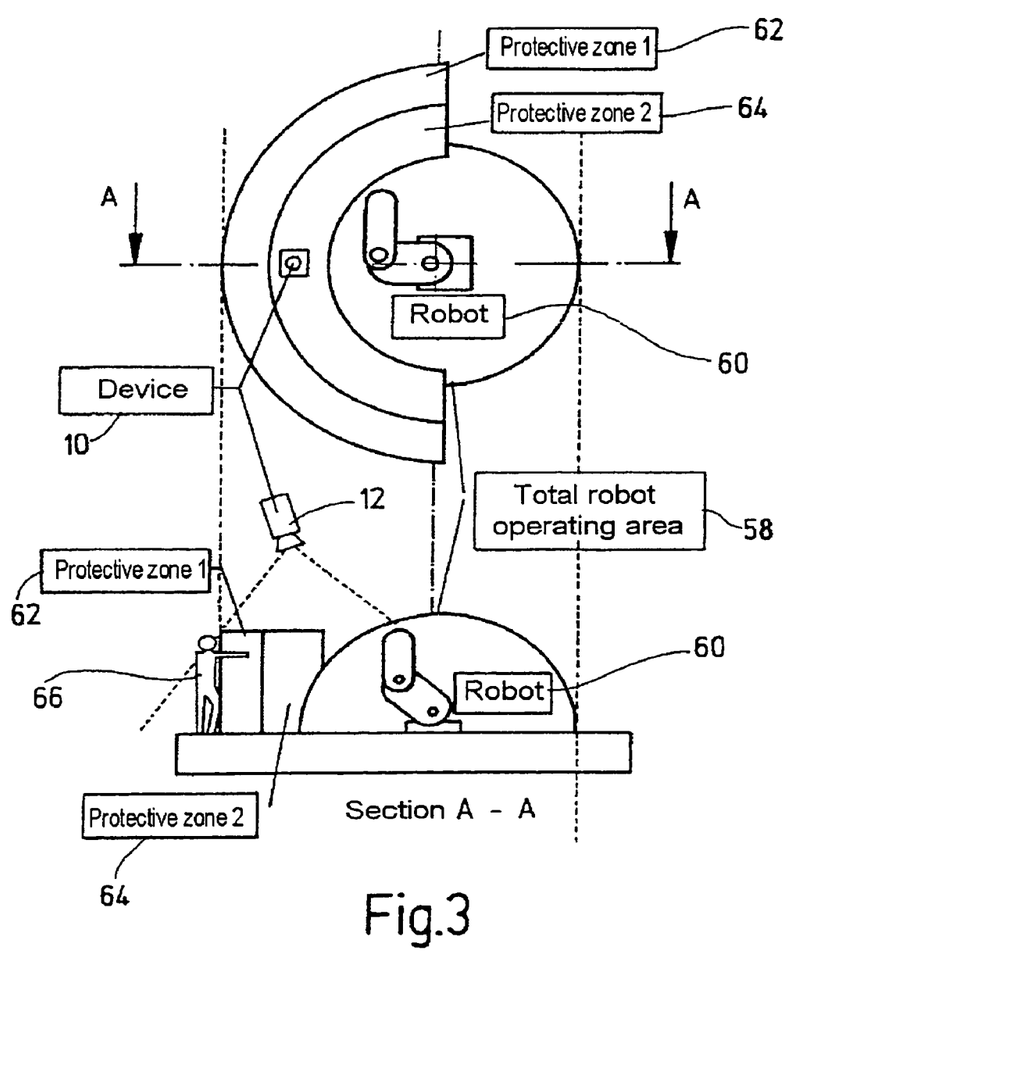
FIG. 3 shows a sketch for explaining a preferred application of the inventive device.

A preferred application of the novel device 10 is illustrated in plan view in the upper part of FIG. 3, while the associated side view is shown in the lower part.

The device 10 serves here to safeguard the hazardous area 58 which originates from an automatically operating robot 60. The hazardous area 58 here lies inside a hemispherical enveloping surface about the robot 60, and corresponds to its movement or operating area. The camera module 12, which includes the two image recording units 16, 18 in a common housing, is arranged above the hazardous area and aligned with the latter.

Reference numerals 62 and 64 denote two staggered protective zones, protective zone 62 forming a type of warning zone, while protective zone 64 forms a true forbidden area. If a foreign object 66 enters the protective zone 62, this is detected by the device 10 on the basis of the scene analysis methods 44, 46. In one exemplary embodiment, the evaluation unit 14 then switches the robot 60 into a mode with reduced speed. An emergency shutdown of the robot 60 does not occur until violation of the protective zone 64.

In a further exemplary embodiment, upon violation of the protective zone 62 the robot 60 is moved into a safe rest position from where the robot 60 can undertake a restart as soon as the device 10 detects that the protective zone 62 is no longer being violated. If, by contrast, the protective zone 64 is being violated, a manual restart is required.

The hazardous area 58 and the protective zones 62, 64 are illustrated here in each case by enveloping curves in the shape of a circle segment. In a preferred exemplary embodiment, the hazardous area 58 and the protective zones 62, 64 are, however, adaptively matched to the movements and operating states of the robot 60. Here, the two scene analysis methods 44, 46 preferably include additional algorithms by means of which parameters of the foreign object 66, for example its shape, its direction and speed of movement, can be identified and tracked. Dependent thereon, the protective zones 62, 64 are adaptively defined about the robot 60 such that the foreign object 66 can be "close" to the robot 60 without being endangered. In this design, it is possible, for example, to arrange a number of robots 60 close to one another in a restricted space, collisions between them being prevented by means of the device 10. Again, in a further exemplary embodiment, workpieces (not illustrated here) that are being fed to the robot 60 can be distinguished from "unauthorized" foreign objects. The mode of operation of the robot 60 can be optimized in this way while the safety of operating staff participating is ensured at the same time.

Figure 4:
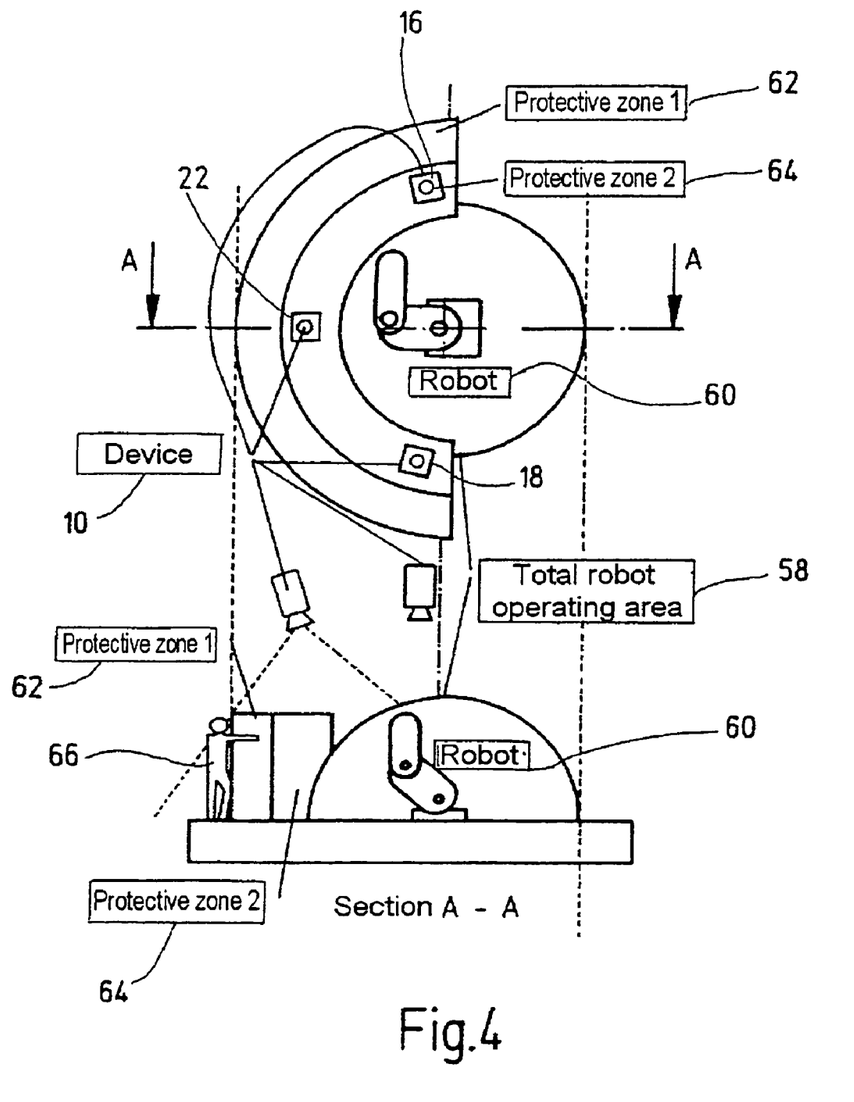
FIG. 4 shows a modification of the application shown in FIG. 3.

FIG. 4 shows a modification of the embodiment from FIG. 3. Rather than a single camera module as in the case of FIG. 3, three image recording units 16, 18, 22 are arranged here spaced apart from one another in each case above the robot 60 and its protective zones 62, 64. The image recording units 16, 18, 22 have extremely wide-angled objectives so that they can cover the protective zones 62, 64 completely even when they are arranged only at a low height above them.

In particular, the image recording units 16, 18, 22 can be catadioptric cameras, i.e. cameras that use curved mirrors as imaging elements, and have an annular field of view around a dead angle lying on the extension of its optical axis. If these cameras are aligned with the robot 60 by means of their optical axis, they certainly cannot cover the robot themselves, but their field of view overlaps well with the annular protective zones 62, 64 around the hazardous area 58. Since the catadioptric cameras can thereby detect any foreign object on its path into the hazardous area 58, it is not disadvantageous that the hazardous area 58 itself largely intersects their dead angles. Instead, this can signify a simplification for the monitoring, since when it does not perceive the robot the evaluation unit 14 also need not distinguish the robot's movements from possible movements of a foreign object in order to detect the latter.

The three cameras 16, 18, 22 are arranged such that the connecting line between two cameras in each case lies in the field of view of the third one. It is therefore always possible to detect the position of a foreign object on such a connecting line by means of images that are supplied by the third camera and one of the two cameras lying on the connecting line.

Figure 5:
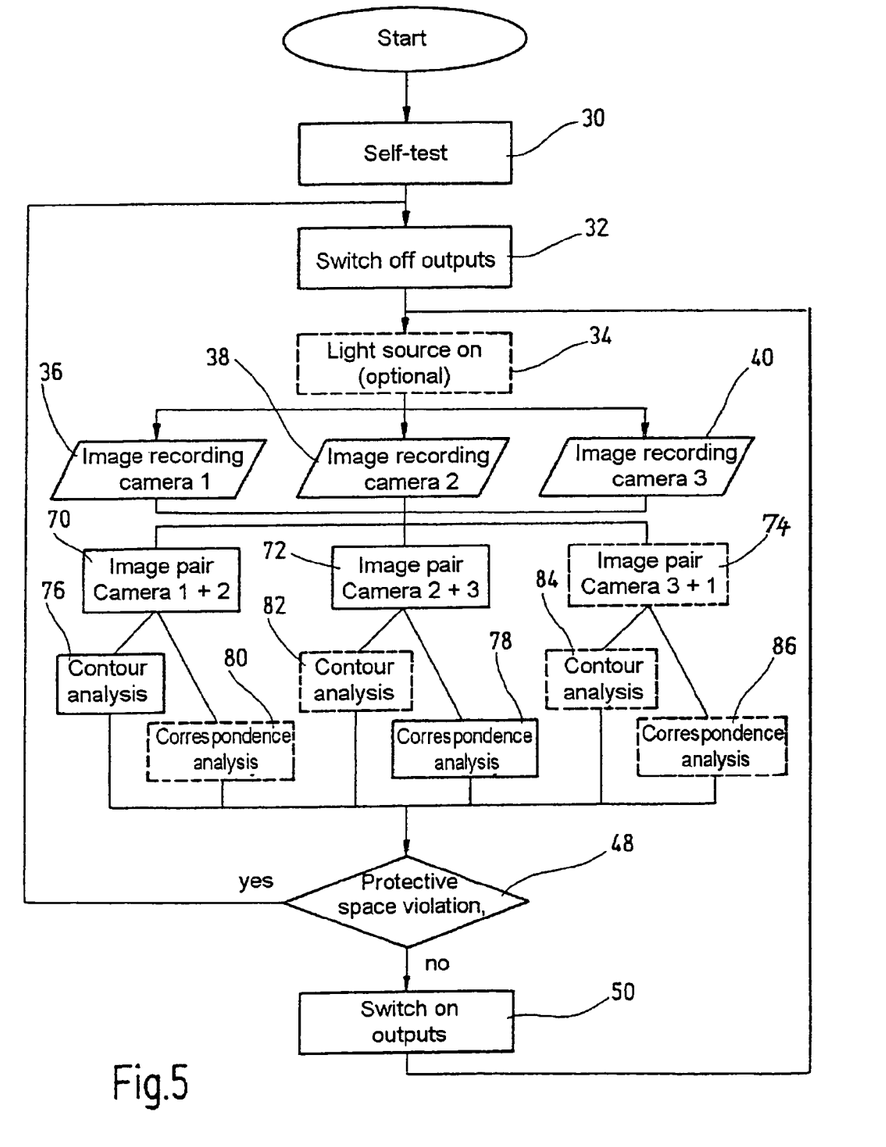
FIG. 5 shows a flowchart of the inventive method in a fashion adapted to the modification of the figure.

The mode of operation of the apparatus from FIG. 4 is described with reference to the flowchart of FIG. 5. The method steps 30, 32, 34, 36, 38 are identical to those already described with reference to FIG. 2, and are therefore not explained again. In addition to the two image recording steps 36, 38 by camera 1 and camera 2, a third image recording step 40 by camera 3 takes place. There are thus three images present which have been recorded simultaneously from different viewing angles and can be combined in a different way to form image pairs. At least two different image pairs are required, and the image pairs are combined in steps 70, 72 from the images recorded by cameras 1 and 2 and by cameras 2 and 3, respectively. A third image pair can be optionally combined from the images of cameras 3 and 1 in step 74.

Two different scene analysis methods are applied to the at least two image pairs thus obtained. In the simplest case, it is possible, for example, to restrict oneself to carrying out a contour analysis on the image pair of cameras 1 and 2 in step 76, and to carrying out a correspondence analysis on the image pair of cameras 2 and 3 in step 78. A higher measure of reliability of detection is achieved when both analysis methods are carried out on each of both image pairs (steps 80, 81), and when, if step 74 has been carried out, the image pair thereof is also subjected to a contour analysis 84 and a correspondence analysis 86.

Figure 2:
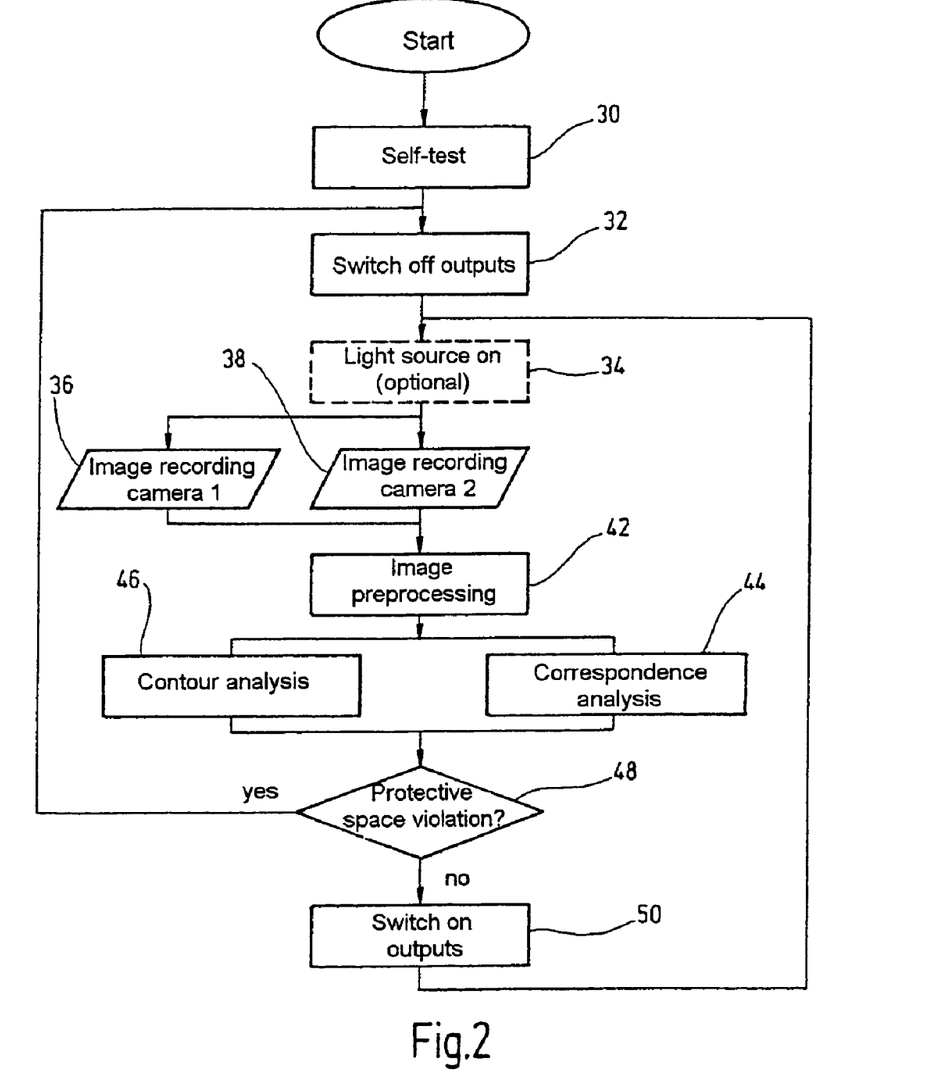
FIG. 2 shows a simplified flowchart for explaining the inventive method.

Steps 48, 50 following the scene analysis are analogous to those from FIG. 2, i.e. in step 48 it is decided by means of the results of the preceding two, four or six scene analyses whether there is a protective space violation. If this is the case, the outputs of the switching device 24 are switched off, otherwise they are switched on in step 50, i.e. the monitored machine is taken into operation, or the outputs remain switched on if the relevant machine is already in operation.

It will be appreciated that the contour analysis and the correspondence analysis can be replaced by any other scene analysis methods, or that it is also possible to carry out more than two different scene analysis methods on a single image pair in order to improve the reliability of detection of a protective space violation. It is also possible to use methods of scene analysis that do not undertake division of the images of the scene into image pairs, but instead establish a three-dimensional description of the scene by minimization from a target function to be determined from all the images simultaneously. Such algorithms are described, for example, in patent application DE 102 59 698-53, published after the priority date, or in the above-cited publication of Matusik et al. These two algorithms are preferably to be applied in common to all the images in order to increase the reliability of detection and to achieve a diverse system.

What is claimed is:

1. A method for safeguarding a defined hazardous area of an automatically operating machine against intrusion of foreign objects, comprising the steps of:
   providing a first, a second and a third image recording units which are arranged offset from one another,
   simultaneously recording a first image of the hazardous area by means of the first image recording unit, a second image of the hazardous area by means of the second image recording unit, and a third image of the hazardous area by means of the third image recording unit,
   forming two different image pairs by combining the first and the second image and by combining the second and the third image, carrying out a first and a second scene analysis on each of the two image pairs in order to detect the foreign objects in the hazardous area, wherein the first and second scene analyses are carried out using at least two algorithmically different methods, and wherein the machine is brought into a safe state when at least one of the scene analysis methods detects the foreign object.

2. The method of claim 1, wherein each of the scene analysis methods is carried out on each image pair.

3. The method of claim 1, wherein one of the scene analysis methods comprises a correlation-based scene analysis, and another one comprises a contour-based scene analysis.

4. The method of claim 1, further comprising the step of providing a reference image of the hazardous area, the reference image being free from the foreign objects to be detected, wherein at least one of the scene analysis methods processes only such image regions in the first, second and third images that differ significantly from the reference image.

5. The method of claim 1, further comprising the step of evaluating a number of temporally successive groups of the first, second and third images in order to determine a movement parameter of the foreign object detected.

6. The method of claim 1, wherein an exposure time for each image recording unit is set as a function of the image recorded by it.

7. The method of claim 1, wherein a three-dimensional representation of the scene is established by minimizing a target function to be determined from all the images simultaneously.

8. A device for safeguarding a defined hazardous area of an automatically operating machine, having a first, second and a third image recording units for recording a first, a second and a third image of the hazardous area, the image recording units being arranged offset from one another an evaluation unit adapted for detecting foreign objects in the hazardous area on the basis of the first, the second and the third images, and a switch that is responsive to the evaluation unit in order to safeguard the machine upon detection of the foreign object in the hazardous area, wherein the evaluation unit is designed for combining said images to form two different image pairs and carrying out two algorithmically different scene analysis methods on each of said image pairs, and wherein the switch is activated when at least one of the scene analysis methods detects the foreign object.

9. The device of claim 8, wherein at least two of the image recording units are arranged in a common housing.

10. The device of claim 8, wherein the evaluation unit is designed for establishing a three-dimensional representation of the scene by minimizing a target function to be determined from all images simultaneously.

11. The method of claim 1, wherein each of the first image, second image and third image encompass the entire defined hazardous area.

12. The method of claim 11, wherein each of the first, second and third image recording units is arranged above the defined hazardous area so that the images of the defined hazardous area are viewed from above.

13. The device of claim 8, wherein each of the first image, second image and third image encompass the entire defined hazardous area.

14. The device of claim 13, wherein each of the first, second and third image recording units is arranged above the defined hazardous area so that the images of the defined hazardous area are viewed from above.

* * * * *